United States Patent [19]
Grayson, IV et al.

[11] 4,241,025
[45] Dec. 23, 1980

[54] CHLORINATOR

[75] Inventors: Joel Grayson, IV, Marietta; Donald P. Kahle, Oxford, both of Ga.

[73] Assignee: Bio-Lab, Inc., Decatur, Ga.

[21] Appl. No.: 63,344

[22] Filed: Aug. 2, 1979

Related U.S. Application Data

[63] Continuation of Ser. No. 959,591, Nov. 13, 1978, abandoned.

[51] Int. Cl.³ .............................................. B01D 11/02
[52] U.S. Cl. .................................... 422/263; 422/265; 422/264; 210/169
[58] Field of Search ............... 422/265, 261, 263, 264, 422/266, 276, 277; 137/268; 210/169

[56] References Cited

U.S. PATENT DOCUMENTS

| | | | |
|---|---|---|---|
| 2,950,959 | 8/1960 | Ve Relle | 422/265 |
| 3,595,786 | 7/1971 | Horvath | 422/264 B |
| 3,598,536 | 8/1971 | Christensen | 422/264 B |
| 3,684,460 | 8/1972 | Arneson | 422/265 |
| 3,846,078 | 11/1974 | Brett | 422/265 |
| 3,946,902 | 3/1976 | Stepanek | 422/264 B |
| 4,129,230 | 12/1978 | Billett | 422/266 |

*Primary Examiner*—Hiram H. Bernstein
*Attorney, Agent, or Firm*—Rodgers & Rodgers

[57] ABSTRACT

A chlorinator of the floating type includes a cannister (1) having oppositely disposed side walls (3 and 4) and a pair of oppositely disposed end walls (5 and 6) is provided with coupling means in the form of ribs (21) disposed on the outer surfaces of the end walls and float means (2) having a central aperture (13) therein whose axis is vertical includes a generally circular central part (13, 14) and a pair of diametrically opposed segments (15 and 16) each of which includes a peripheral part (15a and 16a) each of which in turn includes clearance portions and coupling portions on which a plurality of coupling ribs are formed so that the cannister may be inserted into the aperture formed in the float means with its coupling means adjacent the clearance portions and which then may be rotated about its vertical axis to cause its coupling ribs to engage the coupling ribs (17 and 20) formed on the peripheral portions (15a and 16a) of the segments (15 and 16), an inwardly projecting protrusion (11, 12) is provided on one of the side walls (3) and projects far enough inward to prevent chlorinator sticks stacked one atop the other from clearing the inward protrusions until a predetermined degree of dissolution of such stick occurs after which the stick may fall downwardly in the cannister thus allowing sticks disposed thereabove to move downwardly thereby to regulate the rate at which chlorine is supplied to the body of water in which a chlorinator floats.

2 Claims, 7 Drawing Figures

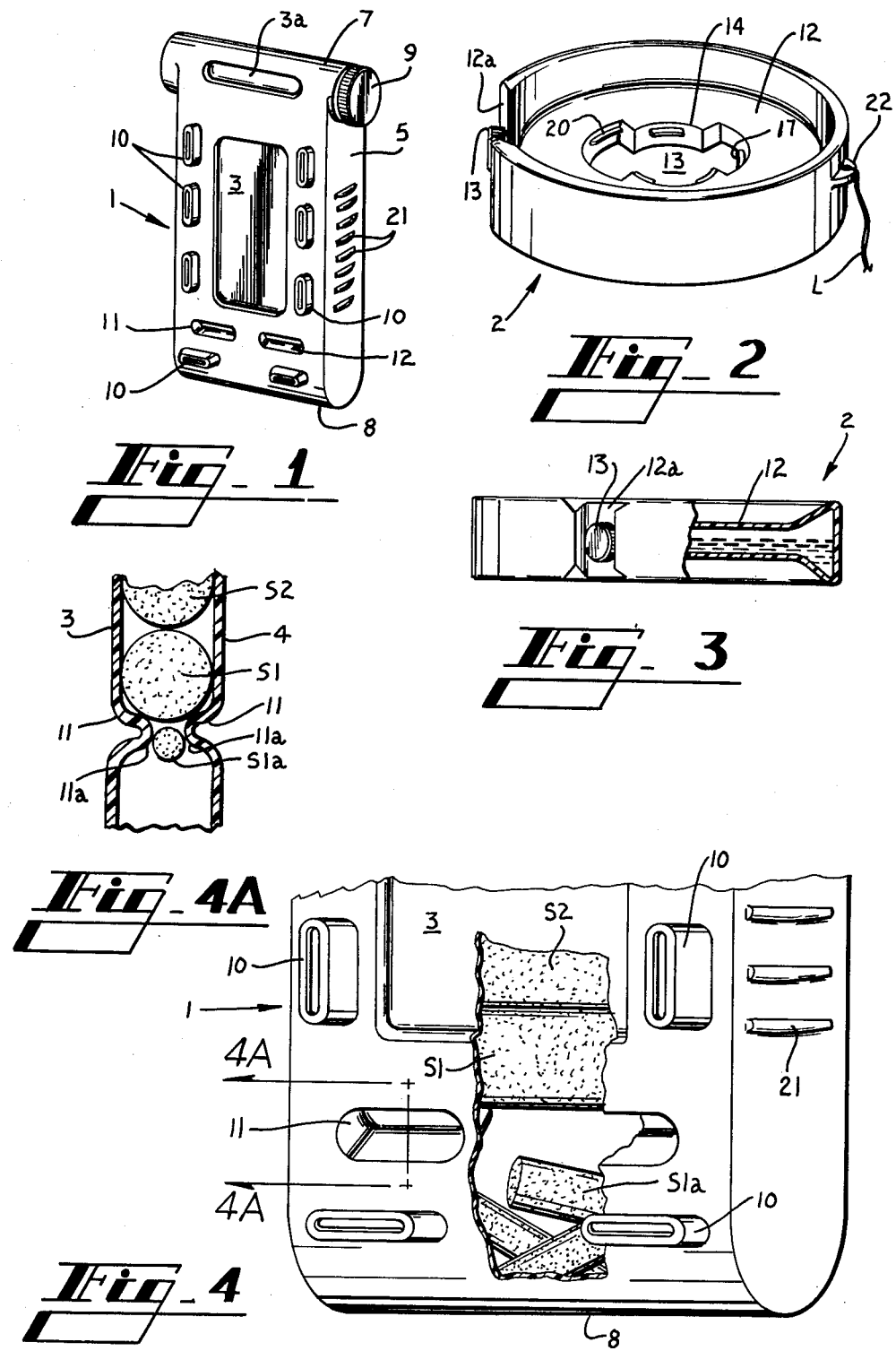

CHLORINATOR

This is a continuation of application Ser. No. 959,591 filed Nov. 13, 1978 and now abandoned.

TECHNICAL FIELD

This invention relates to chlorinators such as are used in conjunction with swimming pools and the like and which are arranged to float on the surface of the pool water and which contain soluble solid material to effect a chlorinating action due to contact with the water in the pool.

BACKGROUND ART

Known float type chlorinators include float means having a central aperture through which a tubular container is inserted and secured at a desired level so that pellets of chlorinating material within the container are dissolved due to contact with pool water to effect dissolution of the pellets and chlorination of the water. Normally the level at which the pellet containing container is mounted relative to the float is such that some of the material contained within the float is disposed above the level of the surface of the water so that as the chlorinating process proceeds, unused material above the surface of the water is lowered into the lower portions of the container and into contact with the water. This type of container is designed to prevent simultaneous contact of the entire chlorinating material in the floating container with the body of water because such contact would effect a concentrated chlorinating action initially which would diminish in concentration and effectiveness as the material dissolves. Such devices however are not responsive to the size of the pellets and are represented by U.S. Pat. No. 3,598,536 Christensen issued Aug. 10, 1971.

DISCLOSURE OF THE INVENTION

According to this invention in one form, buoyant float means having a central aperture is arranged to support a cannister having spaced apart side walls and oppositely disposed end walls and which is arranged for mounting within the central aperture of the float means at an adjustable level and the cannister is provided with an inlet in the upper portion of one end wall to receive chlorinating sticks the length of which is slightly less than the width of the side walls and the transverse dimension of which is slightly less than the spacing between the side walls and an inwardly projecting protrusion is formed near the bottom of one side wall so that a chlorinator stick of normal size is retained in spaced relation from the bottom portion of the cannister but which after a predetermined degree of dissolution takes place due to water from the swimming pool or other body of water flowing through apertures in the walls of the cannister to cause a reduction in the transverse dimension of the chlorinator stick which then is small enough to clear the inwardly projecting protrusion so as to allow the stick to fall to the bottom portion of the cannister. By this means the invention automatically regulates the concentration of chlorine in the pool by feeding sticks stacked in the upper portions of the cannister downwardly in sequence as each stick dissolves and clears the inwardly projecting protrusion. Thus the concentration of chlorine is automatically regulated by means which inherently responds to the transverse dimension of the chlorinator sticks.

According to another feature of the invention, a central aperture formed in the float means includes a central generally circular portion together with a pair of diametrically opposed segmental portions having peripheral outer confines on a portion of each of which coupling means is formed so that a cannister inserted through the central aperture of the float means may move freely in a vertical direction relative to the float means when disposed in one angular position relative to the float means but which then due to coupling means on its end walls may be supported at a predetermined desired level due to rotation of the cannister relative to the float means to cause the coupling means on the end walls of the cannister to engage the coupling means at one portion of the diametrically opposed segments of the central aperture in the float means. Thus by this means the level of the cannister relative to the float means is easily adjusted by a simple uncoupling rotary motion followed by vertical motion of the cannister relative to the float means and in turn by coupling angular rotation about a vertical axis of the cannister relative to the float means so as to fix the cannister in position relative to the float means.

BRIEF DESCRIPTION OF THE DRAWINGS

In the drawings

FIG. 1 is a perspective view of a cannister formed according to one aspect of the invention;

FIG. 2 is a perspective view of float means formed according to another aspect of the invention;

FIG. 3 is a side view partially in cutaway section of the float means shown in FIG. 2;

FIG. 4 is an enlarged fragmentary view of the lower portion of the cannister with a portion of one of its side walls broken away to reveal the contents of the cannister;

FIG. 4A is a cross-sectional detail view taken along the line designated 4A—4A in FIG. 4;

FIG. 6 is a view similar to FIG. 5 but which shows the cannister rotated somewhat in a clockwise direction from the position shown in FIG. 5 and into a coupled position relative to the float means in which position the cannister is secured; and in which

BEST MODE FOR CARRYING OUT THE INVENTION

Figure 5:
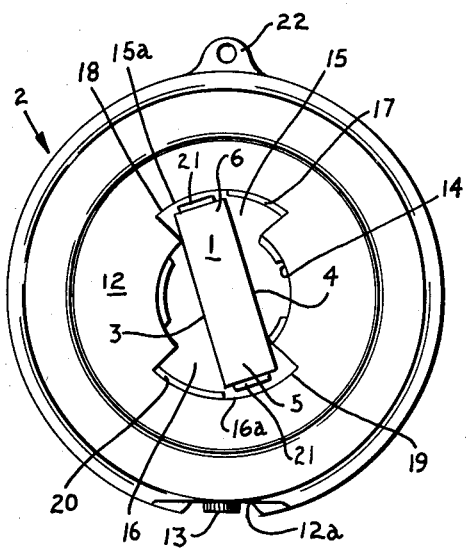
FIG. 5 is a view from above of the entire assembly showing the cannister in its position of clearance relative to the float means.

In the drawings the numeral 1 generally designates a cannister formed according to one aspect of the invention and the numeral 2 generally designates float means formed according to another aspect of the invention.

The cannister 1 includes side walls 3 and 4 and end walls 5 and 6. The top and bottom of the cannister are curved as is apparent from FIG. 1 and as indicated at 7 and 8. A screw cap 9 is formed near the top portion 7 of the cannister and is removable to allow the insertion in sequence of chlorinator sticks such as are indicated at S1 and S2 in FIGS. 4 and 4A. When the sticks S are inserted through the aperture which normally is covered by cap 9 these sticks fall downwardly into the container and form a vertical stack of a single row of sticks S. A recess 3a is formed near the top portion of cannister (1) and serves as a convenient finger gripping means whereby the cannister may be easily manipulated manually.

For allowing water from a body of water to enter the interior of the cannister 1 and to dissolve the sticks S and then to effect a chlorinating action of the body of water, a plurality of openings 10 are formed in side walls 3 and 4.

In accordance with one feature of the invention, inwarding projected protrusions 11 and 12 are formed inside walls 3 and 4 and as is shown in FIGS. 4 and 4A serve to prevent downward passage of stick S1 so long as that stick is of a diameter greater than the spacing between the inner surface of side wall 4 and the innermost parts 11a of the inwardly projecting protrusions 11. After a predetermined degree of dissolution of sticks S1 occurs due to contact with water which enters the interior of the cannister through apertures 10, the stick S1 is reduced in transverse dimension to the size such as is represented at S1A under which conditions the stick passes downwardly to the lower portion of the container. By this means automatic regulation of the feeding of sticks such as S2 and other sticks above S2 is effected according to one aspect of this invention.

Float means 2 includes a circular buoyant 5 body portion 12 together with a central aperture 13. Preferably although not necessarily the body portion 12 is formed of an outer shell of rubber, elastomeric, or other similar material and is filled by buoyant foam which is supplied to the interior of the shell through an aperture covered by cap 12a.

Figure 6:
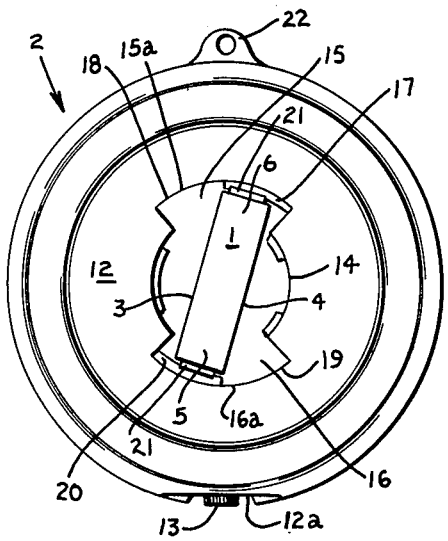

As is apparent particularly from FIGS. 2, 5 and 6, the central aperture 13 includes a central generally circular portion 14 and a pair of diametrically opposed segments 15 and 16. Segment 15 includes coupling elements 17 which may take the form of ribs which project inwardly from the peripheral portion 15a of segment 15. Peripheral portion 15a of segment 15 includes a clearance portion 18 which is devoid of coupling means such as the ribs 17. In like fashion peripheral portion 16a of segment 16 includes a clearance portion 19 which is free of ribs while a series of vertically spaced coupling ribs 20 are disposed as indicated in FIGS. 5 and 6.

For effecting a couped supporting relation with the coupling ribs such as 17 and 20 of the float means 2, a series of coupling ribs 21 are formed on each of the side walls 5 and 6 of cannister 1.

In order to assemble the apparatus into working condition, the cannister is manually grasped at the recess 3a and inserted downwardly through the central aperture 13 as represented by FIG. 5. During this inserting operation the coupling ribs 21 of cannister 1 are disposed adjacent the clearance portion 18 of segment 15 and the clearance portion 19 of segment 16 so that vertical movement of cannister 1 relative to float means 2 may be effected. When the desired level of cannister 1 is reached relative to the float means 2, the cannister is rotated in a clockwise direction from the position represented by FIG. 5 to that represented by FIG. 6. This operation causes the coupling ribs 21 on the cannister 1 to engage corresponding coupling ribs 17 and 20 formed in the diametrically opposed peripheral portions 15a and 16a of the segments 15 and 16 to effect a securing action which prevents relative vertical movement of the cannister 1 relative to the float means 2. It is obvious that if the cannister 1 is mounted in a low position relative to the float means 2, a higher degree of concentration of chlorinating action is effected and if the cannister 1 is disposed in a high position relative to float means 2 a lesser concentration of chlorine is supplied to the water to be chlorinated.

Figure 7:
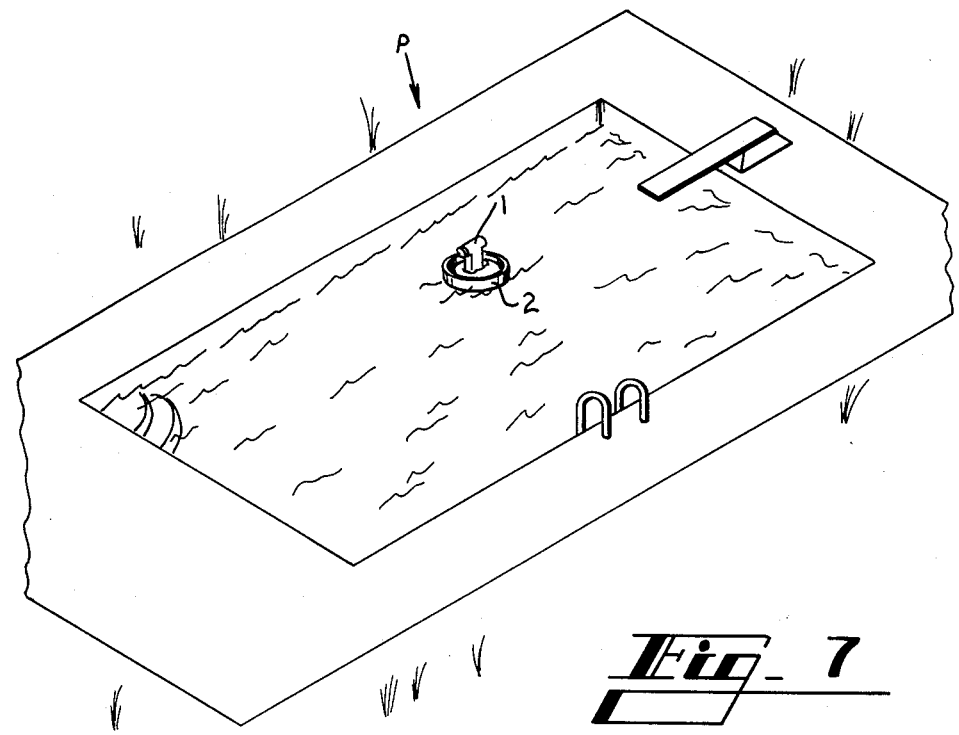
FIG. 7 is a perspective view of a body of water such as a swimming pool and which shows a chlorinator formed according to the invention floating on the surface of the water of the pool.

If desired, the float means 2 with the cannister 1 mounted therein may be allowed to float at random about the surface of the pool such as that indicated at P in FIG. 7. On the other hand, the float means 2 may be secured by simply fastening a line L as indicated in FIG. 2 to the anchoring bracket 22 formed on the outer periphery of the float means 2 and the line L may be anchored to the side wall of the pool or to any other convenient anchoring means.

INDUSTRIAL APPLICABILITY

While the chlorinator of this invention is primarily intended for use with swimming pools and similar bodies of water, it is obvious that the invention may be used to feed other chemicals than chlorine into the body of water in which the device is floating. Also it is apparent that adjustablity is inherent in the device due to the fact that the cannister 1 may be manually set at different levels relative to float 1 and that the automatic regulation of the concentration of additive to the water is effected due to the inwardly projected protrusions 11 and 12 which control the rate at which upper sticks are lowered into contact with the water so as to initiate a chlorinating action and thus to effect a high degree of control of the rate at which chlorine or other substance is supplied per unit of time.

The embodiments of the invention in which an exclusive property or privilege is claimed are defined as follows:

1. A chlorinator arranged to float in a body of liquid to be treated and comprising cannister (1) having a bottom wall 8, a pair of side walls (3,4) and a pair of end walls (5,6) arranged to contain a vertical stack of horizontally disposed elongated chlorinator sticks (S) of similar size and shape which are slowly soluble in water, a pair of oppositely disposed side walls (3,4) of said cannister spaced apart to define one transverse dimension of said cannister which is slightly greater than the transverse dimension of said sticks (S) so as to form a single stack of sticks, apertures (10) formed in at least one of the walls of said cannister, inwardly projected protrusion means (11) formed on at least one of said oppositely disposed side walls and near the bottom (8) thereof for engaging one of said sticks and for holding said stick in spaced relation to the bottom of said cannister, said one of said sticks being slidable past said inwardly projected protrusion means (11) and into the bottom portion of said cannister after predetermined reduction in the transverse dimension thereof due to dissolution in water supplied from said body of water through said apertures (10), float means (2) including a buoyant body having a central aperture (13) whose axis is vertical and which includes a pair of diametrically opposed segments (15,16) and a central portion, each of said segments (15,16) having arcuate peripheral parts on which coupling elements (17,20) are formed for disjointably engaging coupling elements (21) formed on the end walls of said cannister (1) so as to support said cannister (1) at adjustable levels relative to said float means (2) and each of said segments (15,16) having an arcuate clearance portion (18,19) for accommodating vertical movement of said cannister (1) relative to said float means (2), and an inlet (9) having a transverse dimension slightly larger than the transverse dimension of said sticks and formed in a wall of said cannister other than one of said oppositely disposed side walls and near the top (7) thereof through which said sticks are inserted.

2. A chlorinator according to claim 1 wherein said float means (2) comprises an exterior shell and buoyant foam material disposed within said shell.

* * * * *